(12) United States Patent
Sekiguchi et al.

(10) Patent No.: US 8,333,834 B2
(45) Date of Patent: Dec. 18, 2012

(54) HIGH-PURITY AQUEOUS COPPER SULFONATE SOLUTION AND METHOD OF PRODUCING SAME

(75) Inventors: Junnosuke Sekiguchi, Kitaibaraki (JP); Masaomi Murakami, Kitaibaraki (JP); Toru Imori, Kitaibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 0 days.

(21) Appl. No.: 13/497,551

(22) PCT Filed: Feb. 9, 2011

(86) PCT No.: PCT/JP2011/052749
§ 371 (c)(1),
(2), (4) Date: Mar. 22, 2012

(87) PCT Pub. No.: WO2011/102276
PCT Pub. Date: Aug. 25, 2011

(65) Prior Publication Data
US 2012/0174827 A1    Jul. 12, 2012

(30) Foreign Application Priority Data
Feb. 22, 2010   (JP) ................ 2010-035972

(51) Int. Cl.
*C01G 3/00* (2006.01)
*C25D 3/38* (2006.01)
(52) U.S. Cl. .. 106/480; 106/1.13; 106/1.18; 106/287.18
(58) Field of Classification Search ............ 106/480, 106/1.13, 1.18, 287.18
See application file for complete search history.

(56) References Cited

U.S. PATENT DOCUMENTS

| | | | | |
|---|---|---|---|---|
| 4,813,970 | A * | 3/1989 | Kirjanov et al. | 8/442 |
| 6,605,204 | B1 * | 8/2003 | Martyak et al. | 205/123 |
| 6,808,614 | B2 * | 10/2004 | Khaselev et al. | 205/253 |
| 2003/0159941 | A1 * | 8/2003 | Bajaj et al. | 205/296 |
| 2004/0045832 | A1 * | 3/2004 | Martyak | 205/131 |

FOREIGN PATENT DOCUMENTS

| | | |
|---|---|---|
| JP | 2001-115294 | 4/2001 |
| JP | 2006-249478 | 9/2006 |
| JP | 2006-529005 | 12/2006 |
| JP | 2009-533555 | 9/2009 |
| JP | 2010-503226 | 1/2010 |
| JP | 2011-184343 A * | 9/2011 |
| JP | 2011184343 A * | 9/2011 |
| WO | WO 2009/018581 A1 | 2/2009 |

OTHER PUBLICATIONS

International Search Report of PCT/JP2011/052749 (2 pgs.).

* cited by examiner

*Primary Examiner* — Anthony J Green
(74) *Attorney, Agent, or Firm* — Flynn, Thiel, Boutell & Tanis, P.C.

(57) ABSTRACT

An object of the present invention is to provide a high-purity aqueous copper sulfonate solution and a simplified method of producing this solution.
The aqueous copper sulfonate solution of the present invention is characterized in that the copper concentration therein is at least 90 g/L, the content of metal impurities is less than 10 mg/L as metal for each metal impurity, the content of chlorine is less than 10 mg/L, and the sulfonic acid is a sulfonic acid represented by the following general formula $$R\text{—}(SO_3H)_n$$

(in the formula, R represents a lower alkyl group, lower alkylidene group, lower alkylene group, or hydroxyalkyl group and n represents 1 or 2).

5 Claims, No Drawings

HIGH-PURITY AQUEOUS COPPER SULFONATE SOLUTION AND METHOD OF PRODUCING SAME

BACKGROUND OF THE INVENTION

1. Field of the Invention

The present invention relates to a high-purity aqueous copper sulfonate solution and to a method of producing this solution.

2. Description of the Related Art

Copper sulfate is typically used as the copper source in copper electroplating solutions, and copper electroplating solutions based on copper sulfate and sulfuric acid are in use. Copper sulfate has a solubility concentration limit in water of approximately 80 g/L as the copper concentration, and the addition of sulfuric acid thereto results in an escalating reduction in the solubility.

Copper alkylsulfonates, e.g., copper methanesulfonate and so forth, are also used as the copper source for copper electroplating solutions. Copper methanesulfonate can be dissolved in water up to approximately 120 g/L as the copper concentration. Accordingly, changing the copper source for a copper electroplating solution from copper sulfate to copper methanesulfonate makes possible the preparation of a plating solution having a high copper concentration and enables high-speed plating film formations at high current densities; it is also effective as a ingredient salt for the execution of copper plating at high electrodeposition levels.

In recent years, copper plating in semiconductor applications such as filling through silicon vias in which plating at high current densities is possible and high electrodeposition levels are obtained is required, and the use of copper methanesulfonate has thus begun to increase. These semiconductor applications require higher purities for the plating solution and require a depletion of the metal impurities.

The following methods are known for the production of aqueous solutions of copper alkylsulfonates, e.g., copper methanesulfonate: (1) a method in which preparation is carried out by reacting copper carbonate with methanesulfonic acid (the alkylsulfonic acid) (refer to Japanese Patent Publication No. 2001-115294); (2) the electrodissolution of metal in a high-purity sulfonic acid (refer to Japanese Patent Publication No. 2006-529005). Considering these two methods further, the step in (1) in which the copper carbonate is synthesized typically uses copper sulfate and a carbonate salt, and an unsatisfactory purity on their part can result in an unsatisfactory purity for the obtained aqueous copper methanesulfonate solution; moreover, its purification/depletion has been problematic. For example, in the case of the dissolution of copper carbonate in methanesulfonic acid, sodium is present in copper carbonate at several hundred ppm and sodium is then present in the obtained aqueous copper methanesulfonate solution. Therefore, its purification/depletion has been problematic.

In the case of (2), division into an anode compartment and cathode compartment must be implemented using an anion-exchange membrane in order to prevent the copper dissolved from the anode from electrodepositing on the cathode. Anion-exchange membranes typically have the chloride ion bound as the counterion. Thus, even when metal impurities can be avoided because the metal itself is very pure, it has been difficult to prevent contamination by the chloride ion due to the use of the anion-exchange membrane. The chloride ion is used as an additive for copper electroplating solutions and is generally controlled at concentrations of several tens of milligrams per liter in a copper electroplating solution. As a consequence, when the chloride ion is present at a concentration of 10 mg/L or more in a stock solution used for the plating solution, its concentration control then becomes problematic when the plating solution is produced.

In addition, considering the effects on the plating substrate when such a solution is used as the plating solution, the pH of the aqueous copper alkylsulfonate solution is preferably relatively higher, and is preferably 2 or more when possible. The pH is generally low at less than 2 when an aqueous copper alkylsulfonate solution is prepared by method (2). The pH can also be brought to 2 or more by the use of a pH modifier; however, in this case, for example, the sodium ion, potassium ion, or ammonium ion is introduced into the solution by the pH modifier, and it results in its unavoidable admixture into the plating solution as an impurity, making this disadvantageous. The pH can also be made higher by restraining the alkylsulfonic acid concentration in order to carry out the reaction precisely in conformity to the desired copper concentration. In this case, however, the electrolyte concentration in the bath during electrodissolution ends up extremely low; the solution resistance rises and a high voltage occurs; and the durability of the anion-exchange membrane ultimately fails. According to investigations by the present inventors, the purity of the aqueous copper alkylsulfonate solution obtained by method (2) has been unsatisfactory, and in addition the initial costs have been high.

SUMMARY OF THE INVENTION

An object of the present invention is to provide a high-purity aqueous copper sulfonate solution and a simplified method of producing this solution.

As a result of intensive investigations into obtaining a high-purity aqueous copper sulfonate solution by a simplified method, the present inventors discovered that a high-purity aqueous copper sulfonate solution can be obtained by the oxidative dissolution of copper metal in a sulfonic acid solution. The present invention was achieved based on this discovery.

Thus, the present invention is in accordance with the following.

(1) An aqueous copper sulfonate solution characterized in that the copper concentration therein is at least 90 g/L, the content of metal impurities is less than 10 mg/L as metal for each metal impurity, the content of chlorine is less than 10 mg/L, pH is 2 or more, and the sulfonic acid is a sulfonic acid represented by the following general formula

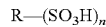

$$R\text{—}(SO_3H)_n$$

(in the formula, R represents a lower alkyl group, lower alkylidene group, lower alkylene group, or hydroxyalkyl group and n represents 1 or 2).

(2) The aqueous copper sulfonate solution according to (1), characterized in that the metals in the aforementioned metal impurities are iron, nickel, silver, lead, magnesium, aluminum, chromium, cobalt, zinc, sodium, potassium, arsenic, antimony, cadmium, gold, indium, manganese, thallium, tin, and titanium.

(3) The aqueous copper sulfonate solution according to (1) or (2), characterized in that the iron, nickel, silver, lead, magnesium, aluminum, chromium, cobalt, zinc, cadmium, gold, manganese, tin, and titanium contents are each less than 1 mg/L.

(4) The aqueous copper sulfonate solution according to any one of (1) to (3), characterized by being produced by oxidation/dissolution of copper metal in a sulfonic acid solution at the temperature of at least 60° C. but less than 100° C.

(5) A method of producing the aqueous copper sulfonate solution according to any one of (1) to (3), characterized by including oxidizing/dissolving copper metal in a sulfonic acid solution at the temperature of at least 60° C. but less than 100° C.

The aqueous copper sulfonate solution of the present invention has a high copper concentration, a metal impurity content of less than 10 mg/L as metal for each metal impurity, and a chlorine concentration of less than 10 mg/L and thus contains little impurity. As a consequence, the aqueous copper sulfonate solution of the present invention enables plating to be performed at high current densities in semiconductor applications, e.g., the filling of through silicon vias, and can also be effectively used for a copper electroplating solution for the execution of copper plating at high electrodeposition levels.

In addition, since the pH of the aqueous copper sulfonate solution of the present invention can be brought to 2 or more, a high-purity plating solution with a pH of at least 2 can also be prepared in the case of copper plating solutions, which makes it possible to mitigate the effects on the plating substrate, e.g., dissolution of the copper seed layer, and to obtain a high-purity plating film.

DETAILED DESCRIPTION OF THE PREFERRED EMBODIMENTS

While an aqueous copper sulfonate solution may be prepared by dissolving copper metal, copper oxide, copper hydroxide, or copper carbonate in a sulfonic acid solution, in order to prepare a high-purity product with a copper concentration of at least 90 g/L, copper metal is preferably used and is preferably oxidized and dissolved in a high-purity sulfonic acid solution. As compared with copper metal, which has little impurity since it is prepared by electrolytic deposition, copper oxide and other copper sources except copper metal are produced via a reaction from copper metal or a copper salt and as a consequence generally have larger metal impurity contents than copper metal, and therefore these are not preferred as copper sources.

For example, when copper carbonate or copper hydroxide is dissolved in a sulfonic acid solution, sodium is readily introduced in large amounts as a metal impurity. In addition, when copper oxide is dissolved in a sulfonic acid solution, the copper concentration cannot be brought up to 90 g/L or more and a copper metal dissolution residue is also produced to some extent. The cause of this is thought to be the partial occurrence of a disproportion reaction due to the influence of cuprous oxide and copper oxide being mixed.

Copper salts such as copper sulfate, copper chloride, copper nitrate, and so forth are not preferred, because the anion, e.g., the sulfate ion, chloride ion, nitrate ion, and so forth, remains in large amounts in the solution upon dissolution, and the copper concentration in the solution also cannot be raised to 90 g/L or more due to the influence of these ions.

The copper concentration can be raised to 90 g/L or more by the oxidation and dissolution of copper metal in a sulfonic acid solution. The copper concentration can be brought up to the saturation concentration for the sulfonic acid solution.

This copper concentration refers to the concentration at normal temperature.

The sulfonic acid in the sulfonic acid solution has the following general formula in the present invention and does not contain halogen

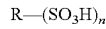

$$R\text{—}(SO_3H)_n$$

(in the formula, R represents a lower alkyl group, lower alkylidene group, lower alkylene group, or hydroxyalkyl group and n represents 1 or 2).

The lower alkyl group, lower alkylidene group, lower alkylene group, and hydroxyalkyl group preferably have from 1 to 5 carbons. Sulfonic acids in which R is a lower alkyl group can be exemplified by methanesulfonic acid, ethanesulfonic acid, propanesulfonic acid, butanesulfonic acid, and pentanesulfonic acid. Sulfonic acids in which R is a lower alkylidene group can be exemplified by methanedisulfonic acid, 1,1-ethanedisulfonic acid, and 1,1-propanedisulfonic acid. Sulfonic acids in which R is a lower alkylene group can be exemplified by 1,2-ethylenedisulfonic acid and 1,3-propylenedisulfonic acid. Sulfonic acids in which R is a hydroxyalkyl group can be exemplified by hydroxymethanesulfonic acid, 2-hydroxyethanesulfonic acid, 3-hydroxypropanesulfonic acid, 4-hydroxy-2-butanesulfonic acid, and 4-hydroxy-1-butanesulfonic acid. Sulfonic acids in which R is a lower alkyl group are preferred for the sulfonic acid, while methanesulfonic acid and ethanesulfonic acid are more preferred and methanesulfonic acid is particularly preferred.

The sulfonic acid solution into which the copper dissolves preferably has a high purity wherein the concentration of each metal component present as an impurity is preferably less than 10 mg/L and the chlorine concentration is preferably less than 10 mg/L.

In addition, the sulfonic acid solution is preferably an aqueous solution of the sulfonic acid, and the sulfonic acid concentration in this sulfonic acid solution is preferably 150 to 360 g/L.

The copper must undergo oxidation in order to effect dissolution of the copper metal in the sulfonic acid solution, and the aqueous copper sulfonate solution of the present invention can be prepared by the oxidation/dissolution of the copper metal in the sulfonic acid solution. The method for oxidizing the copper metal can be exemplified by raising the dissolved oxygen concentration by bubbling an appropriate amount of air or oxygen gas into the heated aqueous sulfonic acid solution, or by adding an oxidizing agent such as aqueous hydrogen peroxide.

Since oxidation/dissolution of the copper metal is facilitated by higher surface areas, the copper metal is preferably used in the form of, for example, a copper powder or copper wire as a source.

As an example, the aqueous copper sulfonate solution of the present invention can be obtained by introducing, for example, copper powder or copper wire into an aqueous sulfonic acid solution, heating to at least 60° C. but less than 100° C. and preferably to at least 80° C. and not more than 90° C., and carrying out oxidation/dissolution while bubbling in air or oxygen gas at a flow rate of 0.01 to 5 L/min per 1 liter of solution. In another example, the aqueous copper sulfonate solution of the present invention can be obtained by introducing, for example, copper powder or copper wire into an aqueous sulfonic acid solution, heating to at least 60° C. but less than 100° C. and preferably to at least 80° C. and not more than 90° C., and carrying out oxidation/dissolution by gradually adding an oxidizing agent such as aqueous hydrogen peroxide.

The concentration of each of the metal impurities in the aqueous copper sulfonate solution of the present invention is not more than 10 mg/L as the metal, and the chlorine concentration in the aqueous copper sulfonate solution of the present invention is not more than 10 mg/L.

When the concentration, as the metal, of any of the metal impurities in an aqueous copper sulfonate solution exceeds 10 mg/L, it will coprecipitate in the copper film deposited during copper electroplating. This can cause errors when used in semiconductor interconnect applications when the device has finally been fabricated. When the chlorine concentration exceeds 10 mg/L, it becomes difficult to manage the chlorine concentration of several tens of milligrams per liter that is added to copper electroplating.

The metals in the metal impurities in the aqueous copper sulfonate solution can be exemplified by iron, nickel, silver, lead, magnesium, aluminum, chromium, cobalt, zinc, sodium, potassium, arsenic, antimony, cadmium, gold, indium, manganese, thallium, tin, and titanium, and in particular the iron, nickel, silver, lead, magnesium, aluminum, chromium, cobalt, zinc, cadmium, gold, manganese, tin, and titanium contents are more preferably less than 1 mg/L in each case.

The content as metal of the metal impurities can be measured by flame atomic absorption analysis in the case of sodium and potassium and by ICP-AES analysis for the other metals. The chlorine content can be measured by ion chromatographic analysis.

The pH of the aqueous copper sulfonate solution of the present invention can be brought to 2 or more. The use of a pH of 2 or more makes it possible, in the case of use as a stock solution for plating solution preparation, to raise the pH of the resulting plating solution to 2 or more, thereby making it possible to relax the effect on the plating substrate, e.g., dissolution of the copper seed layer.

While hydrochloric acid is added as a chloride ion source during plating solution preparation, it is added in very small amounts and has almost no effect on the pH of the plating solution.

A more preferred pH range for the aqueous copper sulfonate solution of the present invention is 2.2 to 3.0, and the pH of the plating solution obtained using this aqueous copper sulfonate solution is also preferably 2.2 to 3.0.

When the pH exceeds 3, the copper ion in the plating solution converts to the oxide or hydroxide and may cause a precipitation.

Because the aqueous copper sulfonate solution of the present invention contains little metal impurity and little chlorine and exhibits a high purity, a high-purity copper plating film is obtained when copper electroplating is performed using a copper electroplating solution that has been prepared using the aqueous copper sulfonate solution of the present invention. In addition, because the pH of the aqueous copper sulfonate solution of the present invention can be raised to 2 or more, the pH of a copper electroplating solution prepared using such a solution can also be raised and the effect on the plating substrate can thereby be relaxed.

The copper concentration in the copper plating solution is preferably 50 to 120 g/L and the sulfonic acid concentration is preferably 150 to 360 g/L.

Accordingly, a copper electroplating solution that uses the aqueous copper sulfonate solution of the present invention can be prepared by adjusting the aqueous copper sulfonate solution of the present invention to a suitable concentration (50 to 120 g/L for the copper concentration and 150 to 360 g/L for the sulfonic acid concentration) and adding from 30 to 100 mg/L chlorine (hydrochloric acid) and adding the other minor additives (polyethylene glycol, polypropylene glycol, etc.) at not more than several hundred mg/L.

Copper electroplating can be run at room temperature (20 to 25° C.) using a cathode current density of 0.1 to 20 A/dm$^2$. Because the copper concentration can be boosted, plating can also be carried out at a higher current density than is the case for the use of another copper salt, e.g., copper sulfate.

EXAMPLES

The present invention is described in detail by the examples provided below.

Example 1

100 g copper powder was introduced into an aqueous solution that contained 300 g methanesulfonic acid; this was brought to 1 L by the addition of ion-exchanged water; and an aqueous copper methanesulfonate solution was then prepared by heating to 90° C. and bubbling in air at a flow rate of 3 L/min using a fritted gas dispersion tube and an air pump. The copper powder underwent complete dissolution over several tens of hours and an aqueous copper methanesulfonate solution was produced that had a copper concentration of 100 g/L. The pH of the obtained aqueous copper methanesulfonate solution was 2.6.

With regard to the impurity concentrations in this solution, the results of flame atomic absorption analysis for the sodium and potassium, ICP-AES analysis for the other metals, and ion chromatographic analysis for the chlorine content are shown in Table 1. All of the components measured were below the limit of quantitation value. For example, in Table 1, the "all components<1 mg/L" in the "Fe, Ni, Ag, Pb, Mg, Al, Cr, Co, Zn, Cd, Au, Mn, Ti, Sn" column indicates that the concentration was less than 1 mg/L for each of Fe, Ni, Ag, Pb, Mg, Al, Cr, Co, Zn, Cd, Au, Mn, Ti, and Sn.

A copper electroplating solution was also prepared by adding additives (50 mg/L chlorine (hydrochloric acid), 10 mg/L disodium bis(3-sulfopropyl) disulfide, 200 mg/L polyethylene glycol, and 1 mg/L Janus green) to the thusly prepared aqueous copper methanesulfonate solution. Via filling was carried out on a silicon wafer carrying a sputtered copper seed layer and having vias with an opening diameter of 20 mm and a depth of 100 mm. The plating conditions were as follows: bath temperature=25° C., cathode current density=5 A/dm$^2$, and plating time=10 min.

After plating, the impurities in the plating film were analyzed (GDMS) and the via filling performance was evaluated. The analysis of the impurities in the plating film was carried out for the same metals as the metal impurities in the aqueous copper methanesulfonate solution.

The via filling performance was judged based on the presence/absence of voids as determined by SEM observation of the cleavage cross section of the obtained copper plating film. Observation of the cross section was done on 100 vias, and a score of "no voids" was rendered when voids were not observed in the side wall regions of any via, while a score of "voids present" was rendered when the appearance of voids in the side wall regions of some vias was observed.

The results are given in Table 2.

Example 2

100 g copper wire scrap was introduced into an aqueous solution that contained 300 g methanesulfonic acid; this was brought to 1 L by the addition of ion-exchanged water; and an aqueous copper methanesulfonate solution was then prepared by heating to 80° C. and bubbling in oxygen at a flow rate of 1 L/min using a fritted gas dispersion tube and an oxygen gas pump. The copper wire underwent complete dissolution over several tens of hours and an aqueous copper methanesulfonate solution was produced that had a copper concentration of 100 g/L. The pH of the obtained aqueous copper methanesulfonate solution was 2.7.

With regard to the impurity concentrations in this solution, the results of flame atomic absorption analysis for the sodium and potassium, ICP-AES analysis for the other metals, and ion chromatographic analysis for the chlorine content are shown in Table 1. All of the components measured were below the limit of quantitation value.

A copper electroplating solution was also produced by adding additives to the thusly prepared aqueous copper methanesulfonate solution as in Example 1. Via filling of a silicon wafer carrying a sputtered copper seed layer was also performed as in Example 1, and evaluation was performed as in Example 1. The results are given in Table 2.

Example 3

100 g copper wire scrap was introduced into an aqueous solution that contained 300 g methanesulfonic acid; this was brought to approximately 0.7 L by the addition of ion-exchanged water; and, while heating to 80° C., 30% aqueous hydrogen peroxide was intermittently added in 10 mL portions while monitoring the status of the reaction. Once a certain amount had been added, decomposition of the hydrogen peroxide began and oxygen gas was generated and this caused oxidation of the copper and its gradual dissolution in the methanesulfonic acid. Aqueous hydrogen peroxide was further added when the reaction had calmed. After several hours the copper wire was finally completely dissolved and an aqueous copper methanesulfonate solution with a copper concentration of 100 g/L was produced. The pH of the obtained aqueous copper methanesulfonate solution was 2.5.

With regard to the impurity concentrations in this solution, the results of flame atomic absorption analysis for the sodium and potassium, ICP-AES analysis for the other metals, and ion chromatographic analysis for the chlorine content are shown in Table 1. All of the components measured were below the limit of quantitation value.

A copper electroplating solution was also produced by adding additives to the thusly prepared aqueous copper methanesulfonate solution as in Example 1. Via filling of a silicon wafer carrying a sputtered copper seed layer was also performed as in Example 1, and evaluation was performed as in Example 1. The results are given in Table 2.

Example 4

100 g copper powder was introduced into an aqueous solution that contained 200 g 2-hydroxyethanesulfonic acid; this was brought to 1 L by the addition of ion-exchanged water; and an aqueous copper 2-hydroxyethanesulfonate solution was then prepared by heating to 90° C. and bubbling in air at a flow rate of 3 L/min using a fritted gas dispersion tube and an air pump. The copper powder underwent complete dissolution over several tens of hours and an aqueous copper 2 hydroxyethanesulfonate solution was produced that had a copper concentration of 100 g/L. The pH of the obtained aqueous copper 2 hydroxyethanesulfonate solution was 2.7.

With regard to the impurity concentrations in this solution, the results of flame atomic absorption analysis for the sodium and potassium, ICP-AES analysis for the other metals, and ion chromatographic analysis for the chlorine content are shown in Table 1. All of the components measured were below the limit of quantitation value.

A copper electroplating solution was also prepared by adding additives to the thusly prepared aqueous copper 2 hydroxyethanesulfonate solution as in Example 1. Via filling of a silicon wafer carrying a sputtered copper seed layer was also performed as in Example 1, and evaluation was performed as in Example 1. The results are given in Table 2.

Example 5

100 g copper powder was introduced into an aqueous solution that contained 300 g methanedisulfonic acid; this was brought to 1 L by the addition of ion-exchanged water; and an aqueous copper methanedisulfonate solution was then prepared by heating to 90° C. and bubbling in air at a flow rate of 3 L/min using a fritted gas dispersion tube and an air pump. The copper powder underwent complete dissolution over several tens of hours and an aqueous copper methanedisulfonate solution was produced that had a copper concentration of 100 g/L. The pH of the obtained aqueous copper methanedisulfonate solution was 2.6.

With regard to the impurity concentrations in this solution, the results of flame atomic absorption analysis for the sodium and potassium, ICP-AES analysis for the other metals, and ion chromatographic analysis for the chlorine content are shown in Table 1. All of the components measured were below the limit of quantitation value.

A copper electroplating solution was also prepared by adding additives to the thusly prepared aqueous copper methanedisulfonate solution as in Example 1. Via filling of a silicon wafer carrying a sputtered copper seed layer was also performed as in Example 1, and evaluation was performed as in Example 1. The results are given in Table 2.

Comparative Example 1

190 g copper carbonate was introduced into approximately 0.7 L ion-exchanged water. The solution was stirred and converted into a slurry and methanesulfonic acid was then added in small portions. The copper carbonate underwent dissolution with the production of carbon dioxide and finally underwent complete dissolution to yield an aqueous copper methanesulfonate solution having a copper concentration of 100 g/L. The pH of the obtained aqueous copper methanesulfonate solution was 2.9.

With regard to the impurity concentrations in this solution, the results of flame atomic absorption analysis for the sodium and potassium, ICP-AES analysis for the other metals, and ion chromatographic analysis for the chlorine content are shown in Table 1. The Na was detected at 230 mg/L while the Fe and Mg were detected at 3 mg/L. All of the other components were below the limit of quantitation value.

A copper electroplating solution was also prepared by adding additives to the thusly prepared aqueous copper methanesulfonate solution as in Example 1. Via filling of a silicon wafer carrying a sputtered copper seed layer was also performed as in Example 1, and evaluation was performed as in Example 1. The results are given in Table 2.

Comparative Example 2

Electrolysis was carried out using copper metal for the anode and an insoluble electrode for the cathode in order to dissolve the copper into a methanesulfonic acid solution. An aqueous copper methanesulfonate solution having a copper concentration of 100 g/L was thus prepared. During the electrolysis, the anode compartment and cathode compartment were divided by an anion-exchange membrane (Selemion AMV from Asahi Glass Co., Ltd.). The pH of the obtained aqueous copper methanesulfonate solution was 1.7.

With regard to the impurity concentrations in this solution, the results of flame atomic absorption analysis for the sodium and potassium, ICP-AES analysis for the other metals, and ion chromatographic analysis for the chlorine content are shown in Table 1. The chlorine was detected at 24 mg/L. All of the other components were below the limit of quantitation value.

A copper electroplating solution was also prepared by adding additives (26 mg/L chlorine (hydrochloric acid), 10 mg/L disodium bis(3-sulfopropyl) disulfide, 200 mg/L polyethylene glycol, and 1 mg/L Janus green) to the thusly prepared aqueous copper methanesulfonate solution. Via filling of a silicon wafer carrying a sputtered copper seed layer and having vias with an opening diameter of 20 mm and a depth of 100 mm was carried out as in Example 1, and evaluation was performed as in Example 1. The results are shown in Table 2.

TABLE 1

|   | Fe, Ni, Ag, Pb, Mg, Al, Cr, Co, Zn, Cd, Au, Mn, Ti, Sn | As, Sb, In, Tl | Na, K, Cl |
|---|---|---|---|
| Example 1 | all components < 1 mg/L | all components < 5 mg/L | all components < 10 mg/L |
| Example 2 | all components < 1 mg/L | all components < 5 mg/L | all components < 10 mg/L |
| Example 3 | all components < 1 mg/L | all components < 5 mg/L | all components < 10 mg/L |
| Example 4 | all components < 1 mg/L | all components < 5 mg/L | all components < 10 mg/L |
| Example 5 | all components < 1 mg/L | all components < 5 mg/L | all components < 10 mg/L |
| Comparative Example 1 | Fe = 3 mg/L, Mg = 3 mg/L other components < 1 mg/L | all components < 5 mg/L | Na = 230 mg/L other components < 10 mg/L |
| Comparative Example 2 | all components < 1 mg/L | all components < 5 mg/L | Cl = 24 mg/L other components < 10 mg/L |

TABLE 2

|   | Metal impurities in the plating film (Fe, Ni, Ag, Pb, Mg, Al, Cr, Co, Zn, Cd, Au, Mn, Ti, Sn, As, Sb, In, Tl, Na, K) | Via filling performance |
|---|---|---|
| Example 1 | Ag = 5 ppm, other components < 0.05 ppm | no voids |
| Example 2 | Ag = 2 ppm, other components < 0.05 ppm | no voids |
| Example 3 | Ag = 3 ppm, other components < 0.05 ppm | no voids |
| Example 4 | Ag = 5 ppm, other components < 0.05 ppm | no voids |
| Example 5 | Ag = 5 ppm, other components < 0.05 ppm | no voids |
| Comparative Example 1 | Ag = 8 ppm, Fe = 0.08 ppm, Mg = 0.06 ppm, Na = 3 ppm, other components < 0.05 ppm | no voids |
| Comparative Example 2 | Ag = 6 ppm, other components < 0.05 ppm | voids present |

In Examples 1 to 5 and Comparative Examples 1 and 2, the silver was below the limit of quantitation value in the aqueous copper sulfonate solution, but silver was detected as a metal impurity in the plating film. The reason for this is as follows: silver has a nobler standard electrode potential than copper, and when silver is present in the plating solution, it undergoes a more preferential deposition than copper during plating; as a consequence, even when silver is present in trace quantities in the plating solution, it will still tend to be present in larger amounts than other metals as an impurity in the plating film. Since silver has a lower resistance than copper, there is no concern that the resistance will rise, unlike the situation with the other metal impurities, but migration is prone to occur at a high silver concentration. A concentration in the plating film of not more than 10 ppm is not problematic.

In addition, due to the use of copper carbonate in Comparative Example 1, sodium was present in the aqueous copper sulfonate solution at 230 mg/L, and as a result the plating film contained 3 ppm sodium. The presence of alkali metal, e.g., sodium, potassium, and so forth, in the plating film has the greatest tendency to cause error upon device fabrication; for example, the presence of several ppm in the plating film results in a very high potential for error upon device fabrication.

The pH of the obtained aqueous copper methanesulfonate solution is 2 or less in Comparative Example 2, and the pH of the copper electroplating solution prepared using this aqueous copper methanesulfonate solution is also low at 2 or less. As a consequence, the thin copper seed layer region was dissolved at coverage defects when copper electroplating was begun and voids were generated as a result.

What is claimed is:

1. An aqueous copper sulfonate solution having a copper concentration of at least 90 g/L, content of metal impurities of less than 10 mg/L as metal for each metal impurity, content of chlorine of less than 10 mg/L, pH of 2 or more, and sulfonic acid represented by the following general formula R—(SO$_3$H)$_n$

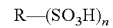

wherein R represents a lower alkyl group, lower alkylidene group, lower alkylene group, or hydroxyalkyl group and n represents 1 or 2.

2. The aqueous copper sulfonate solution according to claim 1, characterized in that the metal impurities contain a metal selected from the group consisting of iron, nickel, silver, lead, magnesium, aluminum, chromium, cobalt, zinc, sodium, potassium, arsenic, antimony, cadmium, gold, indium, manganese, thallium, tin, and titanium.

3. The aqueous copper sulfonate solution according to claim 2, characterized in that the iron, nickel, silver, lead, magnesium, aluminum, chromium, cobalt, zinc, cadmium, gold, manganese, tin, and titanium contents are each less than 1 mg/L.

4. The aqueous copper sulfonate solution according to claim 1, produced by the oxidation and dissolution of copper metal in a sulfonic acid solution at a temperature of at least 60° C. but less than 100° C.

5. A method of producing the aqueous copper sulfonate solution according to claim 1, comprising the steps of oxidizing and dissolving copper metal in a sulfonic acid solution at a temperature of at least 60° C. but less than 100° C.

* * * * *